United States Patent
Krichevsky et al.

(10) Patent No.: US 8,675,455 B1
(45) Date of Patent: *Mar. 18, 2014

(54) SYSTEMS AND METHODS FOR CONTROLLING LIGHT PHASE DIFFERENCE IN INTERFEROMETRIC WAVEGUIDES AT NEAR FIELD TRANSDUCERS

(75) Inventors: Alexander Krichevsky, San Jose, CA (US); Sergei Sochava, Sunnyvale, CA (US); Michael L. Mallary, Sterling, MA (US)

(73) Assignee: Western Digital (Fremont), LLC, Fremont, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 13/399,325

(22) Filed: Feb. 17, 2012

(51) Int. Cl.
  *G11B 7/00* (2006.01)
  *G11B 5/00* (2006.01)

(52) U.S. Cl.
  USPC ............... 369/13.24; 369/13.33; 360/59

(58) Field of Classification Search
  USPC ........ 369/112.27, 13.24, 13.32, 13.33, 13.01, 369/13.02, 13.26; 360/59
  See application file for complete search history.

(56) References Cited

U.S. PATENT DOCUMENTS

| | | |
|---|---|---|
| 5,173,909 A | 12/1992 | Sakano et al. |
| 5,199,090 A | 3/1993 | Bell |
| 5,341,391 A | 8/1994 | Ishimura |
| 5,960,014 A | 9/1999 | Li et al. |
| 6,275,453 B1 | 8/2001 | Ueyanagi et al. |
| 6,671,127 B2 | 12/2003 | Hsu et al. |
| 6,687,195 B2 | 2/2004 | Miyanishi et al. |
| 6,795,630 B2 | 9/2004 | Challener et al. |
| 6,834,027 B1 | 12/2004 | Sakaguchi et al. |
| 6,975,580 B2 | 12/2005 | Rettner et al. |
| 7,027,700 B2 | 4/2006 | Challener |
| 7,042,810 B2 | 5/2006 | Akiyama et al. |
| 7,171,080 B2 | 1/2007 | Rausch |
| 7,190,539 B1 | 3/2007 | Nibarger |
| 7,266,268 B2 * | 9/2007 | Challener et al. ............... 385/37 |
| 7,272,079 B2 | 9/2007 | Challener |
| 7,330,404 B2 | 2/2008 | Peng et al. |

(Continued)

FOREIGN PATENT DOCUMENTS

| | | |
|---|---|---|
| EP | 1498878 A2 | 1/2005 |
| EP | 1501076 A1 | 1/2005 |

OTHER PUBLICATIONS

Chubing Peng, "Surface-plasmon resonance of a planar lollipop near-field transducer", Applied Physics Letters 94, 171106 (2009), 3 pages.

*Primary Examiner* — Thomas Alunkal

(57) ABSTRACT

Systems and methods for controlling light phase difference in interferometric waveguides at near field transducers by selectively heating the light source are provided. One such system for controlling light phase at the NFT of an interferometric waveguide includes a laser, a heater configured to heat the laser, a splitter configured to receive light from the laser and to split the light into a first waveguide arm and a second waveguide arm, the first waveguide arm and the second waveguide arm converging at a junction about opposite the splitter, and the NFT proximate the junction and configured to receive the light, where the first waveguide arm is longer than the second waveguide arm by a preselected distance, and where the heater is configured to generate and maintain a preselected phase difference in the light arriving at the NFT via the first waveguide arm and the second waveguide arm.

30 Claims, 6 Drawing Sheets

(56) References Cited

U.S. PATENT DOCUMENTS

| | | |
|---|---|---|
| 7,440,660 B1 * | 10/2008 | Jin et al. .................. 385/43 |
| 7,486,709 B2 | 2/2009 | Hu et al. |
| 7,500,255 B2 | 3/2009 | Seigler et al. |
| 7,567,387 B2 | 7/2009 | Itagi et al. |
| 7,596,072 B2 | 9/2009 | Buechel et al. |
| 7,649,677 B2 | 1/2010 | Jin et al. |
| 8,077,557 B1 * | 12/2011 | Hu et al. .................. 369/13.24 |
| 2001/0006435 A1 | 7/2001 | Ichihara et al. |
| 2001/0017820 A1 | 8/2001 | Akiyama et al. |
| 2003/0184903 A1 | 10/2003 | Challener |
| 2003/0198146 A1 | 10/2003 | Rottmayer et al. |
| 2004/0001394 A1 * | 1/2004 | Challener et al. ......... 369/13.32 |
| 2004/0001420 A1 | 1/2004 | Challener |
| 2004/0027728 A1 | 2/2004 | Coffey et al. |
| 2004/0228022 A1 | 11/2004 | Ueyanagi |
| 2005/0047013 A1 | 3/2005 | Le et al. |
| 2005/0078565 A1 * | 4/2005 | Peng et al. .................. 369/13.32 |
| 2005/0122850 A1 * | 6/2005 | Challener et al. ......... 369/13.24 |
| 2005/0289576 A1 | 12/2005 | Challener |
| 2007/0081426 A1 | 4/2007 | Lee et al. |
| 2007/0081427 A1 | 4/2007 | Suh et al. |
| 2008/0055343 A1 | 3/2008 | Cho et al. |
| 2008/0180827 A1 | 7/2008 | Zhu et al. |
| 2008/0181560 A1 | 7/2008 | Suh et al. |
| 2008/0198496 A1 | 8/2008 | Shimazawa et al. |
| 2008/0232225 A1 | 9/2008 | Cho et al. |
| 2011/0235480 A1 * | 9/2011 | Goulakov et al. ......... 369/13.35 |
| 2012/0020195 A1 * | 1/2012 | Seigler ........................ 369/13.32 |
| 2012/0039155 A1 * | 2/2012 | Peng et al. .................. 369/13.14 |

* cited by examiner

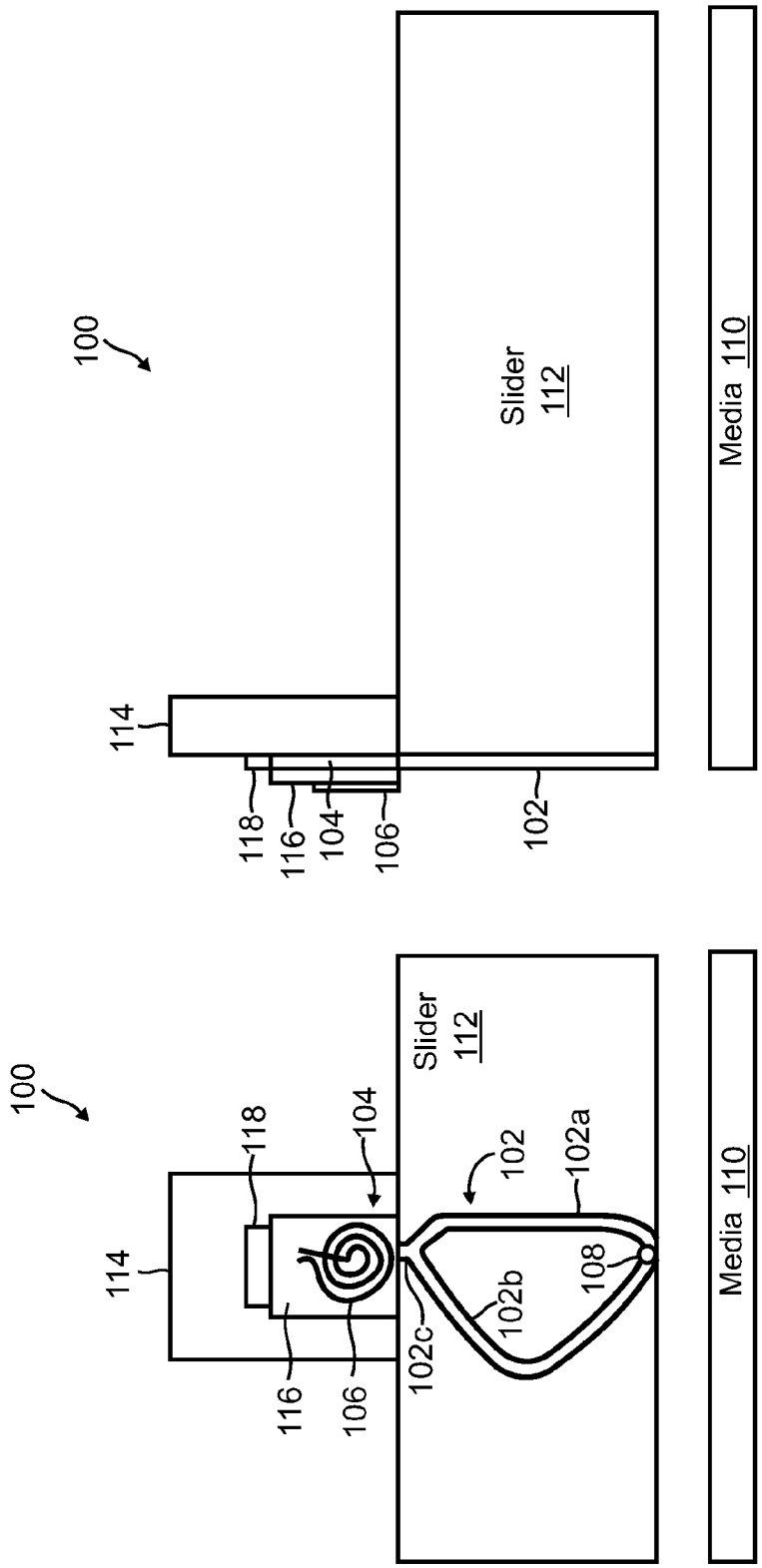

SYSTEMS AND METHODS FOR CONTROLLING LIGHT PHASE DIFFERENCE IN INTERFEROMETRIC WAVEGUIDES AT NEAR FIELD TRANSDUCERS

FIELD

The present invention relates generally energy assisted magnetic recording (EAMR) systems for information storage devices, and more specifically to systems and methods for controlling light phase difference in interferometric waveguides at near field transducers by selectively heating the light source.

BACKGROUND

Energy assisted magnetic recording (EAMR) or heat assisted magnetic recording (HAMR) technology is intended to be used to increase areal density of information storage devices such as hard disks. In these assisted recording systems, a laser beam is delivered through an optical waveguide and interacts with a near field transducer (NFT) that absorbs part of the optical energy and forms a very strong localized electromagnetic field in the near field region. When the localized electromagnetic field is close enough to the recording medium, the recording medium absorbs part of the localized electromagnetic field energy and is thereby heated up thermally, which helps to realize the magnetic recording process.

The efficiency of the NFT depends on the intensity and polarization direction of electromagnetic field (light) delivered to it through the waveguide(s) in order to induce a desired plasmonic resonance. However, controlling the intensity and polarization direction of electromagnetic field (light) delivered to the NFT includes many challenges.

SUMMARY

Aspects of the invention relate to systems and methods for controlling light phase difference in interferometric waveguides at near field transducers by selectively heating the light source. In one embodiment, the invention relates to a system for controlling light phase at a near field transducer (NFT) of an interferometric waveguide, the system including a laser, a heater configured to heat the laser, a splitter configured to receive light from the laser and to split the light into a first waveguide arm and a second waveguide arm, the first waveguide arm and the second waveguide arm converging at a junction about opposite the splitter, and the near field transducer (NFT) proximate the junction and configured to receive the light, where the first waveguide arm is longer than the second waveguide arm by a preselected distance, and where the heater is configured to generate and maintain a preselected phase difference in the light arriving at the NFT via the first waveguide arm and the second waveguide arm.

In another embodiment, the invention relates to a method for controlling light phase at a near field transducer (NFT) of an interferometric waveguide system including a laser, a heater configured to heat the laser, a temperature sensor configured to measure a temperature of the laser, a splitter configured to receive light from the laser and to split the light into a first waveguide arm and a second waveguide arm, the first waveguide arm and the second waveguide arm converging at a junction about opposite the splitter, and the near field transducer (NFT) proximate the junction and configured to receive the light, where the first waveguide arm is longer than the second waveguide arm by a preselected distance, the method including monitoring the temperature of the laser, and adjusting a power level generated by the heater based on the laser temperature to substantially maintain a preselected phase difference in the light arriving at the NFT.

In yet another embodiment, the invention relates to a method of manufacturing a system for controlling light phase at a near field transducer (NFT) of an interferometric waveguide, the method including forming a splitter on a slider, the splitter configured to receive light from a laser and to split the light into a first waveguide arm and a second waveguide arm, the first waveguide arm and the second waveguide arm converging at a junction about opposite the splitter, where the first waveguide arm is longer than the second waveguide arm by a preselected distance, forming the near field transducer (NFT) on the slider and proximate the junction, the NFT configured to receive the light, attaching the laser to a submount, attaching a heater to the submount proximate the laser, the heater configured to heat the laser and thereby generate and maintain a preselected phase difference in the light arriving at the NFT, and attaching the submount to the slider such that the splitter is substantially aligned to receive the light from the laser.

BRIEF DESCRIPTION OF THE DRAWINGS

FIG. 1a is a front view of an energy assisted magnetic recording (EAMR) assembly including an interferometric waveguide configured to receive light from a laser adjacent to a heater and to direct the received light to a near field transducer (NFT) that directs light energy on to a magnetic media, where the heater is configured to generate and maintain a preselected phase difference in the light arriving at the NFT via two waveguide arms in accordance with one embodiment of the invention.

FIG. 1b is a side view of the EAMR assembly of FIG. 1a including the interferometric waveguide positioned within a slider and the laser and heater mounted to a submount attached to the slider in accordance with one embodiment of the invention.

DETAILED DESCRIPTION

Figure 1C:
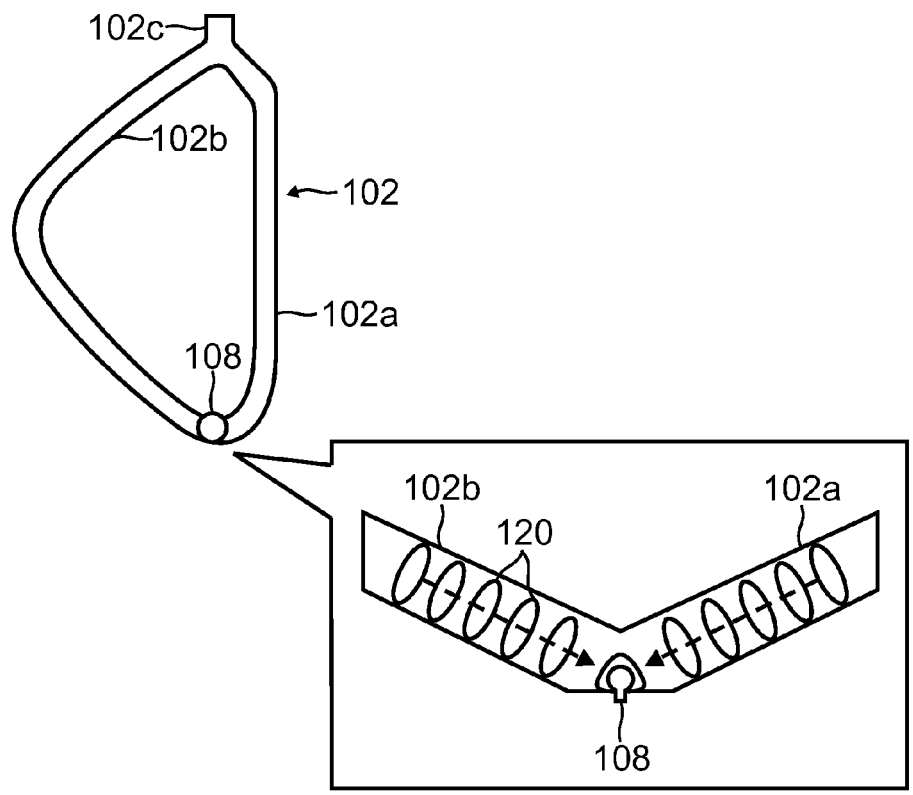
FIG. 1c is a top view of the interferometric waveguide of FIG. 1a including an exploded view of a schematic representation of the standing wave intensity along the waveguide near the NFT in accordance with one embodiment of the invention.

A brief description of some related systems and technologies is helpful to an understanding of this invention. Some of the most promising waveguide designs employ a standing optical wave formed by two beams reaching the near field transducer (NFT) from two different directions. In one design proposed by engineers at the company employing the inventors for the instant application, a lollypop-type NFT design radiates primarily to the left and the right in a plan view, and is optimally driven by light impinging from both directions of a wishbone shaped waveguide with arms that converge at a junction including the NFT.

In particular, a symmetric "interferometer" version of the lollypop-type NFT design was proposed by engineers at the company employing the inventors for the instant application. In this design, the beam coupled into the waveguide is split into each of the two arms of the interferometer waveguide. When these two beams are delivered to the NFT location, a standing wave is formed, causing efficient resonance of the plasmonic structure provided it is located at the antinode of the standing wave. In order to achieve such resonance, light traveling through two arms of the interferometer should accumulate the phase difference of about pi radians. For typical laser diodes operating in 800 nanometer (nm) range (in air/vacuum) and typical mode effective mode index of refraction n of the waveguide core around 1.6 to 1.7, the tolerance of the interferometer arms manufacturing should be better than about 50 nm over their entire length. However, maintaining such tight tolerances is both difficult and expensive. This problem becomes even more complicated when the wavelength of the laser changes as the laser diode is heated up if the two arms are not of equal length.

One way to circumvent this problem is to maintain active control of the light phase by altering the optical path in one of the arms of the interferometer. For instance, thermal expansion of the waveguide and/or changing its mode index of refraction using a neighboring heating element can achieve phase delay and desired phase of incoming light. However, the waveguide materials that are currently used require several hundred degrees to achieve the required path variation over reasonable sub-millimeter waveguide lengths. For instance, the refractive mode index change for $Ta_2O_5$ with temperature (dn/dT) is about $4\times10^-6$ with units of 1/K. This implies that in order to achieve a phase delay of about pi radians in a 0.1 mm-long waveguide, the waveguide temperature has to be raised by about 1000 deg C. Such heating may not be practical, and even if the heating were reduced somewhat by a different choice of the waveguide core materials it would likely cause fly-ability problems when applied asymmetrically to a slider in a magnetic storage device. Alternatively, an inclusion of the electro-optic element can be incorporated in one of the waveguide arms. However, such a solution would require expensive materials and may cause significant reliability problems.

Referring now to the drawings, embodiments of EAMR systems and methods that improve on these designs are illustrated. These improved EAMR systems and methods control light phase at near field transducers of interferometric waveguides by selectively applying heat to the light source. The EAMR systems include a laser and a heater configured to heat the laser. The laser provides light to a waveguide including a splitter which splits the light into a first waveguide arm and a second waveguide arm, where the first waveguide arm and the second waveguide arm converge at an NFT about opposite the splitter along the waveguide. The NFT receives the light from the waveguide arms, which generally have unequal lengths. In order to deliver light of the desired intensity and polarization direction, the heater generates and maintains a preselected phase difference in the light arriving at the NFT via the first waveguide arm and the second waveguide arm by controlling the heat applied to the laser.

A method of operation for the improved EAMR systems can include monitoring the temperature of the laser and adjusting a power level generated by the heater based on the measured laser temperature to substantially maintain the preselected phase difference in the light arriving at the NFT (e.g., a feedback control system). A method of manufacturing the improved EAMR systems can include forming the splitter on a slider, forming the NFT on the slider and proximate the junction of the waveguide arms, attaching the laser to a submount, attaching the heater to the submount proximate the laser, and attaching the submount to the slider such that the splitter is substantially aligned to receive the light from the laser.

FIG. 1a is a front view of an energy assisted magnetic recording (EAMR) assembly 100 including an interferometric waveguide 102 configured to receive light from a laser 104 (not visible in FIG. 1a but see FIG. 1b) adjacent to a heater 106 and to direct the received light to a near field transducer (NFT) 108 that directs light energy on to a magnetic media 110, where the heater 106 is configured to generate and maintain a preselected phase difference in the light arriving at the NFT 108 via two waveguide arms (102a, 102b) in accordance with one embodiment of the invention. The waveguide 102 is mounted to, or positioned within, a magnetic transducer or slider 112 positioned just above the media 110. The heater 106 and laser 104 are mounted to a submount 114 that is attached to a top surface of the slider 112. A capping layer 116 is positioned between the heater 106 and the laser 104. In some embodiments, the heater 106 can be thought of as including both a heating element 106 and the capping layer 116.

The assembly further includes a temperature sensor 118 mounted to a front surface of the submount 114 and adjacent to the laser 104. The temperature sensor 118 can be used to measure the temperature of the laser 104. The assembly further includes a controller (not visible but see FIG. 2) that can be coupled to the laser 104, the heater 106, the slider 112 and/or the temperature sensor 118 to ensure that a preselected phase difference and corresponding preselected temperature of the laser 104 is substantially maintained. The controller can be coupled to other components in order to achieve these intended functions, and/or positioned in other suitable locations. The controller can be implemented using a microprocessor, a microcontroller, programmable logic devices, discrete components, or any combination of these components.

In operation, the laser 104 generates light and directs it on the waveguide 102. The waveguide 102 receives the light and splits the light into a first waveguide arm 102a and a second waveguide arm 102b at a splitter 102c positioned close to the laser 104. The first and second waveguide arms (102a, 102b) first diverge and then converge at a junction within which the NFT 108 is positioned. The NFT 108 then converts the received light energy into near-field electromagnetic energy and directs it into the media 110. The near-field electromagnetic energy can effectively be converted into thermal energy delivered to the media 110. As the light is delivered to the NFT 108 from the waveguide arms (102a, 102b) with the preselected phase difference, the light from the waveguide arms efficiently and constructively combines at the NFT to maximize the energy delivery to the media. In several embodiments, the preselected phase difference, which can be a delay in phase or an advance in phase, is an odd multiple of 180 degrees, or (2n+1) multiplied by 180 degrees where n is an integer. In one such embodiment, n is in a range from about 100 to about 1000. In other embodiments, other optimal phase difference or phase delays can be used. In one embodiment, for example, the phase difference can be a non-integer multiple of 180 degrees. In one embodiment, the preselected phase difference is an even multiple of 180 degrees, or (2n) multiplied by 180 degrees where n is an integer. In some embodiments, the preselected phase difference is chosen to substantially maximize a local heating of the magnetic media 110 while substantially minimizing an optical power generated by the laser 104.

In some embodiments, the temperature sensor 118 is used to measure the temperature of the laser 104 and the heat generated by the heater 106 is adjusted to maintain the preselected phase difference based on the measured temperature. In other embodiments, no temperature sensor is used and the heater 106 is simply configured to maintain the preselected phase difference by providing a substantially constant preselected temperature.

In several embodiments, the temperature sensor 118 includes a resistance temperature detector (RTD). To achieve good measurement accuracy and stability the resistance of the RTD can be chosen to be within the range of about 1 to 100 kilo-ohms. Some common materials for the RTD include platinum, nickel, and/or copper. It is also possible to monitor the laser 104 (e.g., laser diode) temperature by measuring the voltage drop across the laser diode itself as a function of any given current value. Like most semiconductor structures, the laser diode 104 changes its electrical resistance as the temperature raises. The advantage of this approach is twofold: it can eliminate the need for a dedicated temperature transducer, and also, perhaps more importantly, the temperature is measured at the lasing junction itself, which can be ideal for feedback purposes.

As can be seen from FIG. 1a, the second waveguide arm 102b is substantially longer than the first waveguide arm 102a. In other embodiments, the second waveguide arm 102b is only slightly longer than the first waveguide arm 102a. In other embodiments, the first waveguide arm 102a is longer than the second waveguide arm 102b. In some embodiments, the difference in length between the first waveguide arm 102a and the second waveguide arm 102b is intentional. In other embodiments, the difference in length is a result of process manufacturing variations. In several embodiments, the difference in length is selected to induce a preselected sensitivity of the phase difference (e.g., phase delay or phase advance) in the light arriving at the NFT to the temperature of the laser. In several embodiments, the difference in length is based on a mode index of refraction of the first waveguide arm 102a and the second waveguide arm 102b, a preselected ambient temperature, and/or a preselected operational temperature range. In some embodiments, the splitter 102c splits the light evenly between the first and second waveguide arms (102a, 102b). In other embodiments, the splitter 102c splits the light unevenly.

In the embodiment illustrated in FIG. 1a, the preselected phase difference is accomplished, at least in part, based on the preselected difference in length between the waveguide arms. In other embodiments, the preselected phase difference can be accomplished using other suitable implementations. For example, co-pending U.S. patent application Ser. No. 13/399,250, entitled, "SYSTEMS AND METHODS FOR INCREASING MEDIA ABSORPTION EFFICIENCY USING INTERFEROMETRIC WAVEGUIDES", the entire content of which is expressly incorporated herein by reference, describes a number of suitable techniques for accomplishing the preselected phase difference for an interferometric waveguide.

In FIG. 1a, the heater 106 is implemented using a spiral trace on a capping layer. In other embodiments, other suitable implementations of a heater or heating element can be used.

FIG. 1b is a side view of the EAMR assembly 100 of FIG. 1a including the interferometric waveguide 102 positioned within the slider 112 and the laser 104 and heater 106 mounted to the submount 114 attached to the slider 112 in accordance with one embodiment of the invention.

FIG. 1c is a top view of the interferometric waveguide 102 of FIG. 1a including an exploded view of a schematic representation of the standing wave light intensity along the waveguide near the NFT 108 in accordance with one embodiment of the invention. As can be seen in the exploded view, the standing wave light is directed from the first waveguide arm 102a toward the NFT 108, and similarly, the standing wave light is directed from the second waveguide arm 102b toward the NFT 108. A number of antinodes 120 are shown within the standing wave which constructively arrives at the NFT 108.

Figure 2:
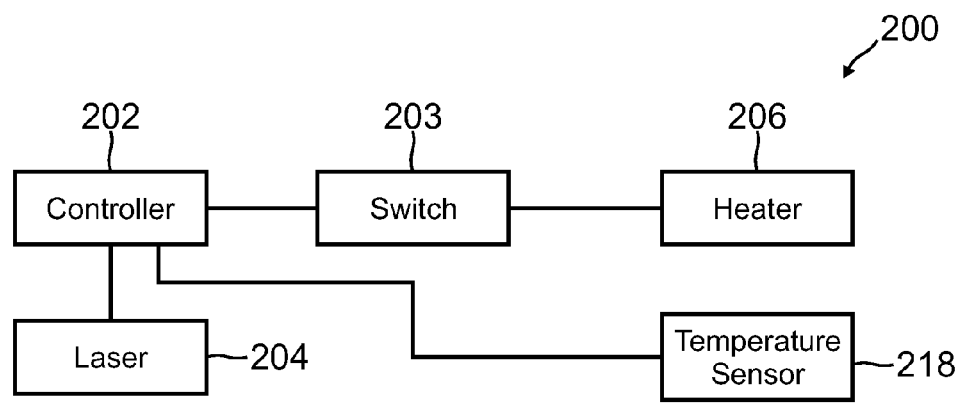
FIG. 2 is a schematic block diagram of a control system for controlling an EAMR assembly including an interferometric waveguide with a heat controlled laser and feedback control in accordance with one embodiment of the invention.

FIG. 2 is a schematic block diagram of a control system 200 for controlling an EAMR assembly including an interferometric waveguide with a heat controlled laser 204 and feedback control in accordance with one embodiment of the invention. The control system 200 includes a controller 202 coupled to a switch 203, a laser 204, and a temperature sensor 218. The switch 203 is coupled to a heater 206. The controller 202 is configured to control the heater 206 using the switch 203. The temperature sensor 218 is positioned proximate the heater 206 and measures the temperature of the heater 206.

The controller 202 can increase or decrease the power applied to the heater 206 based on temperature information received from the temperature sensor 218. In several embodiments, the controller 202 can also control the power applied at the laser 204. In a number of embodiments, the heater 206, laser 204, and temperature sensor 218 are arranged in the manner depicted in FIGS. 1a and 1b. In some embodiments, the controller 202 can be implemented within central processing circuitry associated with a disk storage device. In such case, the switch 203 can implemented within pre-amplifier circuitry of the disk storage device. In several embodiments, the switch 203 is capable of receiving a digital current value and supplying a corresponding analog current value to the heater 206. In other embodiments, the control system 200 can be arranged in other suitable configurations to control the heater 206.

Figure 3:
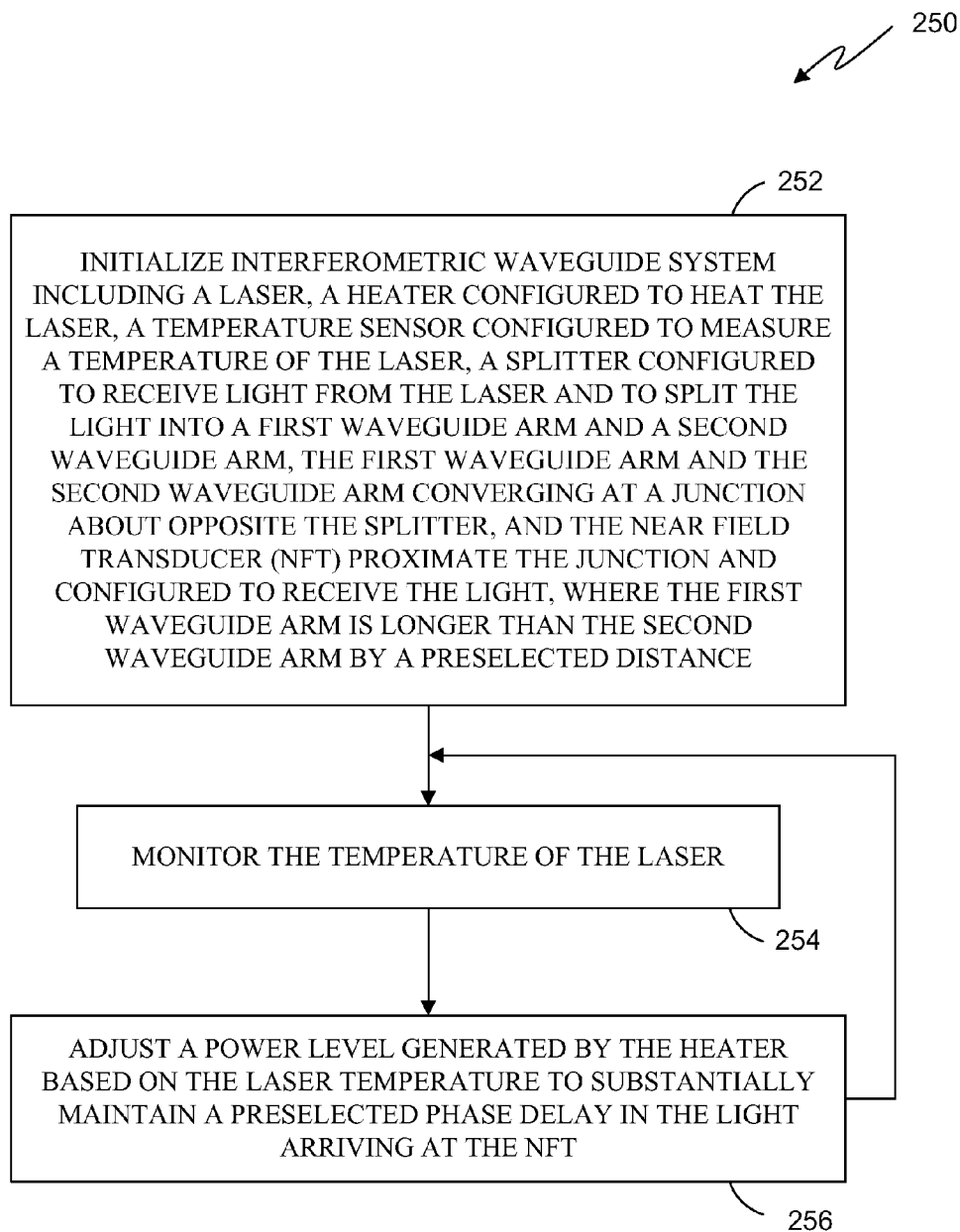
FIG. 3 is a flowchart of a general process for controlling an EAMR assembly including an interferometric waveguide with a heat controlled laser and feedback control in accordance with one embodiment of the invention.

FIG. 3 is a flowchart of a general process 250 for controlling an EAMR assembly including an interferometric waveguide with a heat controlled laser and feedback control in accordance with one embodiment of the invention. In particular embodiments, control process 250 can be used in conjunction with the EAMR assemblies described above. The process first initializes (252) an interferometric waveguide system including a laser, a heater configured to heat the laser, a temperature sensor configured to measure a temperature of the laser, a splitter configured to receive light from the laser and to split the light into a first waveguide arm and a second waveguide arm, the first waveguide arm and the second waveguide arm converging at a junction about opposite the splitter, and a near field transducer (NFT) proximate the junction and configured to receive the light, where the first waveguide arm is longer than the second waveguide arm by a preselected distance. In some embodiments, no initialization is performed.

The process then monitors (254) the temperature of the laser. The process then adjusts (256) a power level generated by the heater based on the laser temperature to substantially maintain a preselected phase difference in the light arriving at the NFT. The process can then return to monitoring the laser temperature in block 254.

In some embodiments, the initialization includes a calibration process for determining an optimum power level for the heater and a corresponding optimal laser temperature. In such case, the initializing block can also include setting the heater power level to the optimum power level. In some embodiments, the process further includes periodically determining the optimum power level for the heater and the corresponding optimal laser temperature in a re-calibration process.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 4:
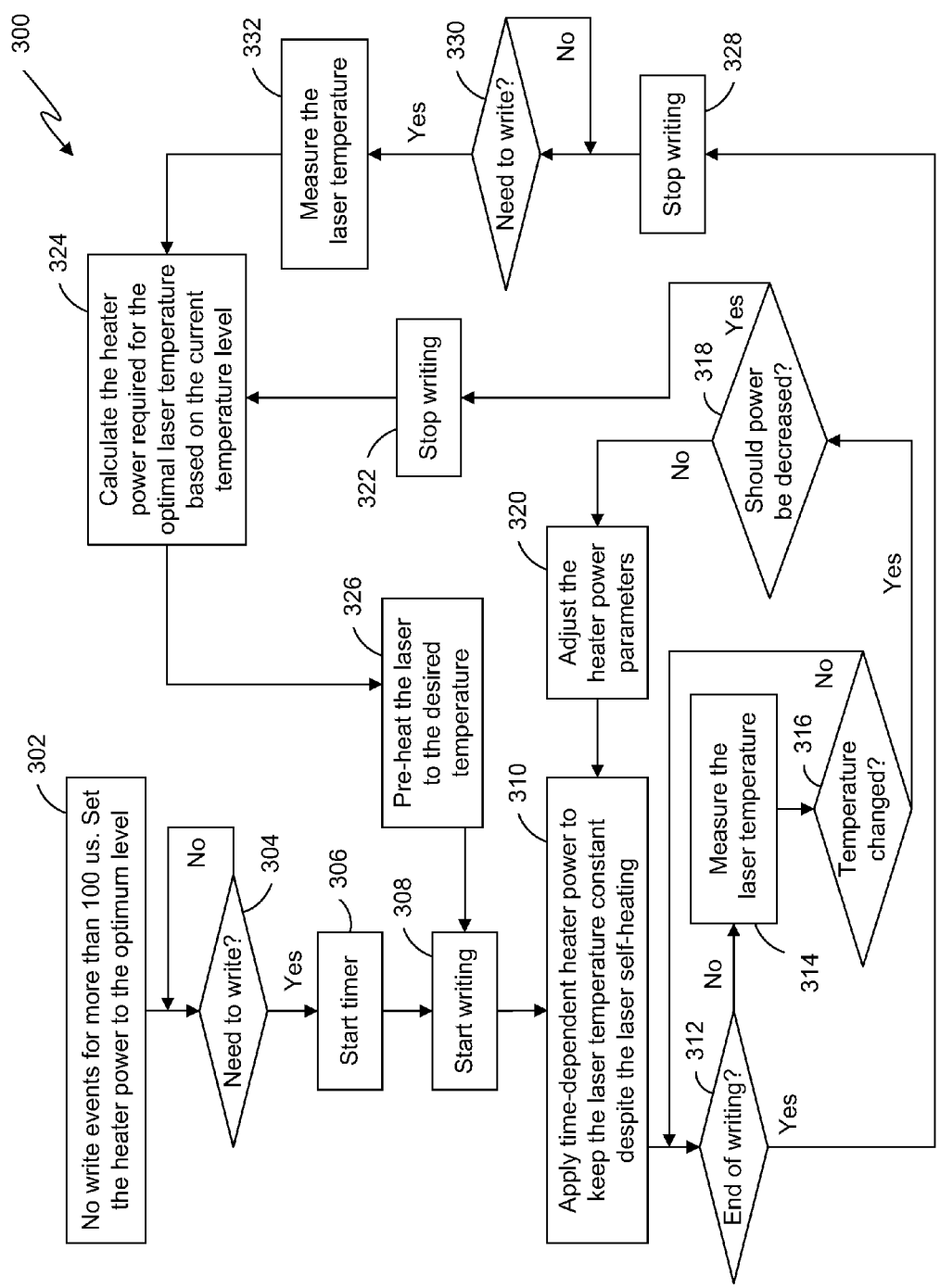
FIG. 4 is a flowchart of a detailed process for controlling an EAMR assembly including an interferometric waveguide with a heat controlled laser and feedback control in accordance with one embodiment of the invention.

FIG. 4 is a flowchart of a detailed process 300 for controlling an EAMR assembly including an interferometric waveguide with a heat controlled laser and feedback control in accordance with one embodiment of the invention. In particular embodiments, feedback control process 300 can be used in conjunction with the EAMR assemblies described above. The process first sets (302) the heater power level to a predetermined optimum power level if no write events occurred for more than a predetermined duration (e.g., about 100 microseconds) at the slider. The process then determines (304) whether there is a need to write data. If not, the process keeps checking at block 304. If so, the process starts (306) a timer. The process then starts (308) writing data.

The process then applies (310) time dependent heater power to keep the laser temperature substantially constant despite any laser self heating. The process then determines (312) whether the writing is done. If not, the process measures (314) the laser temperature. The process then determines (316) whether the laser temperature changed. If not, the process returns to determining whether the writing is done in block 312. If the laser temperature changed in block 316, the process then determines (318) whether the heater power should be decreased. If not, the process adjusts (320) the heater power parameters accordingly and returns to applying the time dependent heater power to keep the laser temperature substantially constant in block 310.

If the heater power should be decreased in block 318, the process then stops (322) writing. From block 322, the process then calculates (324) the heater power required for the optimal laser temperature based on the current laser temperature level. In one embodiment, the calculated heater power may require an increase in the laser temperature, thereby bringing a contiguous antinode to the vicinity of the NFT to maintain the preselected phase difference at the NFT. From block 324, the process then pre-heats (326) the laser to the desired optimal temperature and then returns to starting to write data in block 308.

If the process determines that the writing is done in decision block 312, the process then stops (328) writing. From block 328, the process determines (330) whether there is a need to write data. If not, the process returns to determining whether there is a need to write data in block 328. If there is a need to write data in block 330, the process measures (332) the laser temperature. From block 332, the process then calculates (324) the heater power required for the optimal laser temperature based on the current laser temperature level, pre-heats (326) the laser to the desired optimal temperature, and then returns to starting to write data in block 308.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 5:
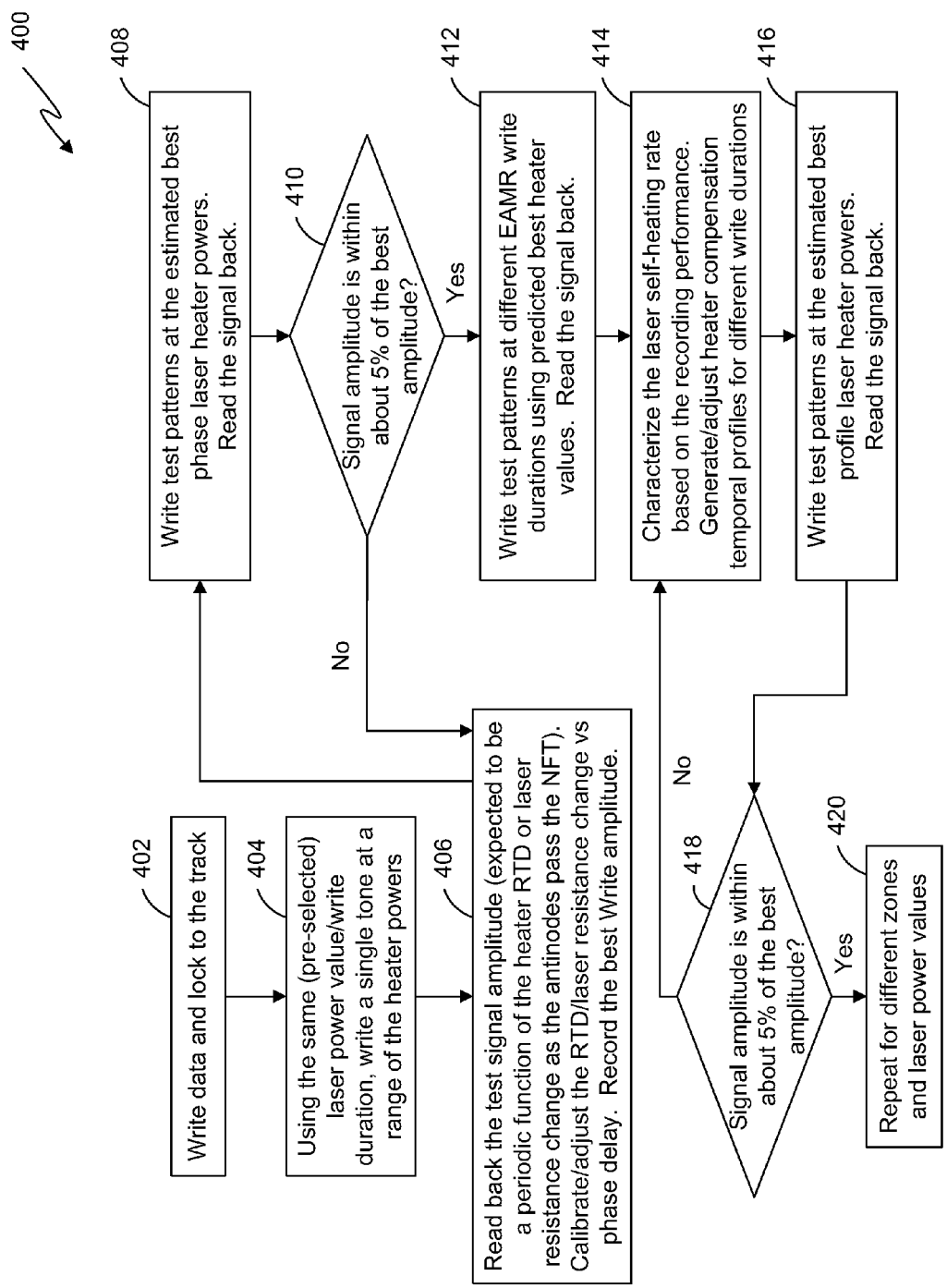
FIG. 5 is a flowchart of a process for calibrating an EAMR assembly including an interferometric waveguide with a heat controlled laser in accordance with one embodiment of the invention.

FIG. 5 is a flowchart of a process 400 for calibrating an EAMR assembly including an interferometric waveguide with a heat controlled laser in accordance with one embodiment of the invention. In particular embodiments, calibration process 400 can be used in conjunction with the EAMR assemblies described above. The process first writes (402) data to a selected track and stays locked on the selected track. The process then writes (404) a single tone at a range of heater powers using about the same preselected laser power and about the same write duration. In several embodiments, the actions of block 404 can be seen as a sort of coarse tuning.

The process then reads (406) back the test signal write amplitude which is expected to be a periodic function of the heater RTD or laser resistance change as antinodes pass the NFT. Also in block 406, the process calibrates and/or adjusts the RTD or laser resistance change in accordance with the preselected phase delay, and then records the best or highest write amplitude. The process then writes (408) test patterns at the estimated best phase laser heater powers and reads the signal amplitude back, where the best phase corresponds with the best signal to noise ratio (SNR) for given tone. In several embodiments, the actions of block 408 can be seen as a sort of fine tuning. The process then determines (410) whether the signal amplitude is within about 5 percent of the best write amplitude from block 406. If not, the process returns to block 406 to read back the test signal write amplitude.

If the signal amplitude is within about 5 percent of the best write amplitude in block 410, the process writes (412) test patterns at different EAMR write durations using predicted best heater values, and then reads the signal amplitude back. The process then characterizes (414) the laser self heating rate based on the recording performance. Also in block 414, the process generates and/or adjusts heater compensation temporal profiles for different write durations. In several embodiments, this action is dynamic and depends on both the write history and expected duration of future writes. The process then writes (416) test patterns at estimated best profile laser heater powers (e.g., laser heater powers that give best results) and reads the signal amplitude back. The process then determines (418) whether the signal amplitude is within about 5 percent of the best write amplitude from block 406. If not, the process returns to block 414 to characterizes the laser self heating rate. If the signal amplitude is within about 5 percent of the best write amplitude in block 410, the process repeats (420) process 400 for different zones and laser power values.

In several embodiments, repeated writing of the test patterns at different laser power/duration and heater compensation profiles should help find and maintain the optimal phase delay between the arms of the interferometer. In such case, if a cheaper copper (or similar) RTD is used, periodic recalibration can address potential changes in the RTD properties due to conditions such as oxidation or aging. In some embodiments, it may also possible to completely eliminate active monitoring of the laser temperature by periodically running optimization procedures based on recording performance. In such case, the calibration can be done against the heater power values with no relation to the temperature sensor reading. However, in that case, the laser cooling (from the previous write events) rates should be taken into account. The calibration may need to be repeated every several minutes until the drive temperature stabilizes.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 6:
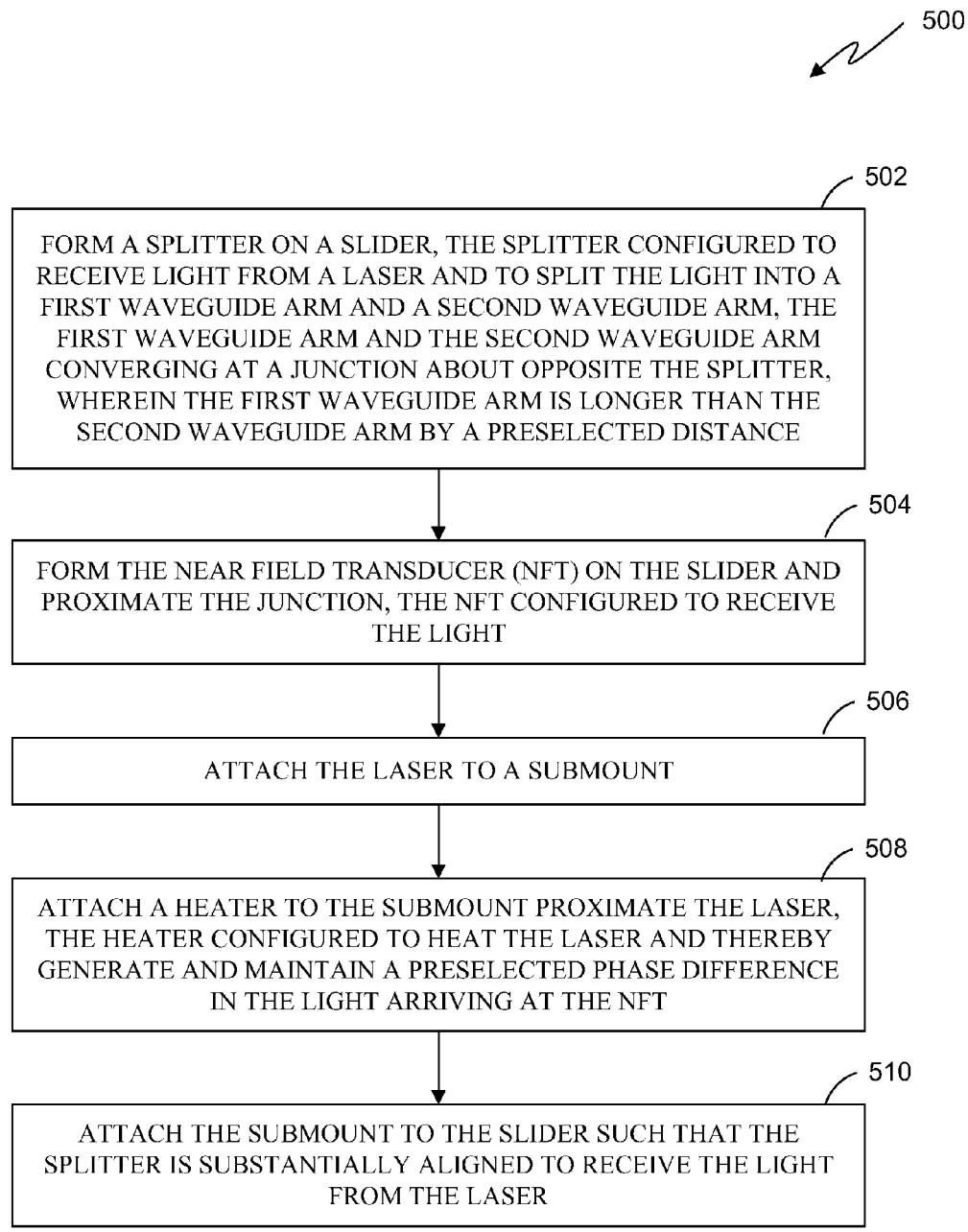
FIG. 6 is a flowchart of a process for manufacturing an EAMR assembly including an interferometric waveguide with a heat controlled laser in accordance with one embodiment of the invention.

FIG. 6 is a flowchart of a process 500 for manufacturing an EAMR assembly including an interferometric waveguide with a heat controlled laser in accordance with one embodiment of the invention. In particular embodiments, manufacturing process 500 can be used to form the EAMR assemblies described above. The process first forms (502) a splitter on a slider, where the splitter is configured to receive light from a laser and to split the light into a first waveguide arm and a second waveguide arm. In such case, the first waveguide arm and the second waveguide arm converge at a junction about opposite the splitter, and the first waveguide arm is longer than the second waveguide arm by a preselected distance. The process then forms (504) a near field transducer (NFT) on the slider and proximate the junction, the NFT configured to receive the light. The process then attaches (506) the laser to a submount. The process attaches (508) a heater to the submount proximate the laser, where the heater is configured to heat the laser and thereby generate and maintain a preselected phase difference in the light arriving at the NFT. The process then attaches (510) the submount to the slider such that the splitter is substantially aligned to receive the light from the laser.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

In several embodiments described above, the first waveguide arm 102a is depicted as being shorter than the second waveguide arm 102b. In other embodiments, the first waveguide arm 102a is longer than the second waveguide arm 102b.

What is claimed is:

1. A system for controlling light phase at a near field transducer (NFT) of an interferometric waveguide, the system comprising:
a laser;
a heater configured to heat the laser;
a splitter configured to receive light from the laser and to split the light into a first waveguide arm and a second waveguide arm, the first waveguide arm and the second waveguide arm converging at a junction opposite the splitter in a light propagating direction; and
the near field transducer (NFT) proximate the junction and configured to receive the light,
wherein the first waveguide arm is longer than the second waveguide arm by a preselected distance, and
wherein the heater is configured to generate and maintain a preselected phase difference in the light arriving at the NFT via the first waveguide arm and the second waveguide arm.

2. The system of claim 1, wherein the preselected phase difference is about pi radians multiplied by (2n+1), where n is an integer.

3. The system of claim 2, wherein n ranges from about 100 to about 1,000.

4. The system of claim 1, wherein the preselected phase difference is about pi radians multiplied by 2n, where n is an integer.

5. The system of claim 1, further comprising a temperature sensor configured to measure a temperature of the laser.

6. The system of claim 5, further comprising a controller coupled to the temperature sensor and the heater, the controller configured to maintain a preselected temperature at the laser.

7. The system of claim 6, wherein the preselected temperature is selected to maintain the preselected phase difference.

8. The system of claim 5, wherein the temperature sensor comprises a resistance temperature detector.

9. The system of claim 5, wherein the temperature sensor is configured to measure the laser temperature by measuring a resistance of the laser.

10. The system of claim 1:
wherein the NFT is configured to direct heat on a magnetic media surface;
wherein the preselected phase difference is chosen to maximize a local heating of the magnetic media while minimizing an optical power of the laser.

11. The system of claim 1, wherein the preselected distance is selected to induce a preselected sensitivity of the phase difference in the light arriving at the NFT to a temperature of the laser.

12. The system of claim 1, wherein the preselected distance is selected based on a mode index of refraction of the first waveguide arm and the second waveguide arm, a preselected ambient temperature, and a preselected operational temperature range.

13. The system of claim 1:
wherein the laser is mounted to a submount,
wherein the heater is mounted proximate the laser,
wherein the submount is mounted to a top surface of a slider,
wherein the splitter, the first waveguide arm, the second waveguide arm, and the NFT are mounted to the slider, the NFT being mounted proximate an air bearing surface of the slider, and
wherein the slider is configured to be suspended above a magnetic media disk.

14. The system of claim 1, wherein the splitter is configured to split the light about equally between the first waveguide arm and the second waveguide arm.

15. A method for controlling light phase at a near field transducer (NFT) of an interferometric waveguide system comprising a laser, a heater configured to heat the laser, a temperature sensor configured to measure a temperature of the laser, a splitter configured to receive light from the laser and to split the light into a first waveguide arm and a second waveguide arm, the first waveguide arm and the second waveguide arm converging at a junction opposite the splitter in a light propagating direction, and the near field transducer (NFT) proximate the junction and configured to receive the light, wherein the first waveguide arm is longer than the second waveguide arm by a preselected distance, the method comprising:
monitoring the temperature of the laser; and
adjusting a power level generated by the heater based on the laser temperature to substantially maintain a preselected phase difference in the light arriving at the NFT.

16. The method of claim 15, further comprising determining an optimum power level for the heater and a corresponding optimal laser temperature using a calibration process.

17. The method of claim 16, further comprising setting, at least initially, the heater power level to the optimum power level.

18. The method of claim 16, wherein the adjusting the heater power level comprises substantially maintaining the optimal laser temperature.

19. The method of claim 16, further comprising determining, periodically, the optimum power level for the heater and the corresponding optimal laser temperature using a re-calibration process.

20. The method of claim 15, wherein the preselected phase difference is about pi radians multiplied by (2n+1), where n is an integer.

21. The method of claim 20, wherein n ranges from about 100 to about 1,000.

22. The method of claim 15, wherein the preselected phase difference is about pi radians multiplied by 2n, where n is an integer.

23. The method of claim 15, wherein the temperature sensor comprises a resistance temperature detector.

24. The method of claim 15, wherein the temperature sensor is configured to measure the laser temperature by measuring a resistance of the laser.

25. The method of claim 15:
wherein the NFT is configured to direct heat on a magnetic media surface;
wherein the preselected phase difference is chosen to maximize a local heating of the magnetic media while minimizing an optical power of the laser.

26. The method of claim 15, wherein the preselected distance is selected to induce a preselected sensitivity of the phase difference in the light arriving at the NFT to a temperature of the laser.

27. The method of claim 15, wherein the preselected distance is selected based on a mode index of refraction of the first waveguide arm and the second waveguide arm, a preselected ambient temperature, and a preselected operational temperature range.

28. The method of claim 15:
wherein the laser is mounted to a submount,
wherein the heater is mounted proximate the laser,
wherein the submount is mounted to a top surface of a slider,
wherein the splitter, the first waveguide arm, the second waveguide arm, and the NFT are mounted to the slider, the NFT being mounted proximate an air bearing surface of the slider, and
wherein the slider is configured to be suspended above a magnetic media disk.

29. The method of claim 15, wherein the splitter is configured to split the light about equally between the first waveguide arm and the second waveguide arm.

30. A method of manufacturing a system for controlling light phase at a near field transducer (NFT) of an interferometric waveguide, the method comprising:
forming a splitter on a slider, the splitter configured to receive light from a laser and to split the light into a first waveguide arm and a second waveguide arm, the first waveguide arm and the second waveguide arm converging at a junction opposite the splitter in a light propagating direction, wherein the first waveguide arm is longer than the second waveguide arm by a preselected distance;
forming the near field transducer (NFT) on the slider and proximate the junction, the NFT configured to receive the light;
attaching the laser to a submount;
attaching a heater to the submount proximate the laser, the heater configured to heat the laser and thereby generate and maintain a preselected phase difference in the light arriving at the NFT; and
attaching the submount to the slider such that the splitter is substantially aligned to receive the light from the laser.

* * * * *